United States Patent [19]
Janicki et al.

[11] Patent Number: 5,693,130
[45] Date of Patent: Dec. 2, 1997

[54] INK CONTAINING A HARD ASPHALT

[75] Inventors: Richard T. Janicki, Oaklawn; Stanley A. Wasielewski, Lockport, both of Ill.

[73] Assignee: Owens-Corning Fiberglas Technology, Inc., Summit, Ill.

[21] Appl. No.: 608,873

[22] Filed: Feb. 29, 1996

[51] Int. Cl.$^6$ ................................................ C09D 11/12
[52] U.S. Cl. ........................... 106/31.91; 106/31.57; 106/31.85
[58] Field of Search .................. 106/31 R, 32, 106/20 C, 281.1, 31.91, 31.57, 31.85

[56] References Cited

U.S. PATENT DOCUMENTS

| | | | |
|---|---|---|---|
| 67,697 | 8/1867 | Wurth | 106/31 R |
| 412,183 | 10/1889 | Holt | 106/31 R |
| 1,259,713 | 3/1918 | Baumgardner | 106/31 R |
| 1,383,512 | 7/1921 | Barmier | 106/31 R |
| 2,649,381 | 8/1953 | Hempel et al. | 106/31 R |
| 2,750,296 | 6/1956 | Curado et al. | 106/31 R |
| 2,852,398 | 9/1958 | Goessling | 106/31 R |
| 3,075,844 | 1/1963 | Hall et al. | 106/31 R |
| 4,193,815 | 3/1980 | Burris | 106/31 R |
| 4,282,037 | 8/1981 | Burris | 106/31 R |
| 4,307,169 | 12/1981 | Matkan | 430/111 |
| 4,439,510 | 3/1984 | McLoughlin | 430/137 |
| 5,000,787 | 3/1991 | Krishnan | 106/32 |
| 5,378,272 | 1/1995 | Romagosa et al. | 106/281.1 |

FOREIGN PATENT DOCUMENTS 129309 11/1976 Japan.

*Primary Examiner*—Helene Klemanski
*Attorney, Agent, or Firm*—C. Michael Gegenheimer

[57] ABSTRACT

An ink contains a petroleum-derived asphalt, a colorant, and a carrier for the asphalt and colorant. The asphalt has a softening point from 105° C. to 155° C. and a saturates content not greater than 32% by weight. Preferably at least 50% by weight of the carrier is a material selected from aliphatic oils, aliphatic solvents, and mixtures thereof. A method of making the ink includes granulating the asphalt to a particle size not greater than 2.38 mm (8 mesh), dissolving the asphalt in the carrier, and adding a colorant to the carrier.

20 Claims, No Drawings

INK CONTAINING A HARD ASPHALT

TECHNICAL FIELD

This invention relates in general to inks, and in particular to printing inks containing a petroleum-derived hard asphalt.

BACKGROUND ART

An ink is a dispersion of a pigment or a solution of a dye in a carrier. The ink is in fluid, paste or powder form, and can be applied to and dried on a substrate such as paper. Printing inks are the most commercially important type of ink, and are used in many different applications including newspapers, books, other written publications, and packaging.

Printing inks have typically contained an oil or solvent carrier, a pigment such as carbon black dispersed in the carrier, and a resinous binder for the carbon black. Addition of the binder can increase the cost and complexity of manufacturing the ink. While these printing inks have performed relatively well, it would be desirable to lower the cost of the inks while retaining their good performance. In particular, it would be advantageous to provide an ink that incorporates an inexpensive material to replace the binder and a portion of the carbon black.

Some inks have included naturally occurring asphaltites such as gilsonite or grahamite. Sometimes these inks have not included a binder. However, it has now been found difficult to control the viscosity of inks made from naturally occurring asphaltites or asphalts. The control of viscosity of the ink is important for providing an ink that performs acceptably in a printing operation. If the ink viscosity is too high, the ink may blot on a printing plate or substrate instead of spreading evenly. If the ink viscosity is too low, the ink may not adequately adhere to the printing plate or substrate. Thus, an ink should be provided which allows good control of the ink viscosity.

It would also be desirable to provide a printing ink which does not require an aromatic oil or solvent for use as the carrier. Such aromatic materials are recently coming under increased scrutiny from an environmental standpoint. Aromatic oils are also difficult to clean from printing presses, have a limited shelf life, and can have an objectionable odor. Thus, it would be advantageous to provide an ink that can use aliphatic oils and solvents as the carrier instead of aromatic materials.

DISCLOSURE OF THE INVENTION

This invention relates to an ink containing a petroleum-derived asphalt, a colorant, and a carrier for the asphalt and colorant. The asphalt has a softening point from about 105° C. to about 155° C. Preferably the asphalt has an original softening point from about 50° C. to about 100° C., and is subjected to an oxidizing process to provide the desired final softening point. The asphalt also has a saturates content not greater than 32% by weight. A preferred asphalt comprises, by weight, from about 80% to 100% (asphaltenes and resins) and from 0% to about 20% saturates. Preferably at least about 50% by weight of the carrier of the ink is a material selected from aliphatic oils, aliphatic solvents, and mixtures thereof. A method of making the ink includes granulating the asphalt to a particle size not greater than about 2.38 mm (8 mesh), dissolving the asphalt in a carrier, and adding a colorant to the carrier.

The petroleum-derived asphalt for use in the ink is an inexpensive material available in plentiful supply. The asphalt can replace the binder and a portion of the carbon black of a conventional ink. In contrast to a naturally occurring asphalt, the petroleum-derived asphalt allows good control of the ink viscosity. Further, the oxidizing process provides uniformity and consistency of the asphalt composition so that viscosity of the ink can be controlled. The asphalt also is a hard asphalt so that the ink dries thoroughly on the substrate instead of remaining tacky. It has been discovered that the hard asphalt is more soluble than expected in aliphatic oils and solvents. As a result, these aliphatic materials can be used as the carrier for the ink instead of the less desirable aromatic materials.

Various objects and advantages of this invention will become apparent to those skilled in the art from the following detailed description of the preferred embodiment.

BEST MODE FOR CARRYING OUT THE INVENTION

An asphalt suitable for producing the ink of this invention is a petroleum-derived asphalt produced by a petroleum refining operation. As mentioned above, it has been found that the petroleum-derived asphalt provides better control of viscosity of the ink than a naturally occurring asphalt or asphaltite. Preferably a single component raw material is used for the asphalt instead of combining more than one asphalt. This enables the production of an ink having more consistent viscosity and solubility properties.

A suitable asphalt has a softening point from about 105° C. to about 155° C., preferably from about 120° C. to about 135° C., and more preferably from about 125° C. to about 130° C. The softening point of the asphalt is measured by the ring and ball method, ASTM D-36. The asphalt preferably has a penetration not greater than about 15 dmm at 25° C., and more preferably not greater than about 10 dmm, as measured by ASTM D-5. Thus, the asphalt is a hard asphalt as opposed to a soft asphalt such as AC grade (road grade) or roofer's flux. It has been found that the hard asphalt is well suited for use in a printing ink, because it produces an ink which dries thoroughly on the substrate instead of remaining tacky. A soft asphalt, on the other hand, would usually produce an ink which remains tacky. It has also been found that the hard asphalt is adapted for granulation to a particle size suitable for manufacturing the ink of this invention. In contrast, a soft asphalt would be very difficult to granulate.

Preferably an asphalt starting material is subjected to an oxidizing process to provide these softening point and penetration properties. As mentioned above, it has been found that an oxidizing process provides uniformity and consistency of the asphalt composition to enable control of the ink viscosity. The asphalt starting material preferably has a softening point from about 50° C. to about 100° C., and more preferably from about 65° C. to about 85° C. The oxidizing process comprises blowing air, oxygen or an oxygen-inert gas mixture through the asphalt at an elevated temperature for a time sufficient to harden the asphalt to the desired properties. For example, the asphalt can be air blown in a converter at a temperature from about 175° C. to about 290° C. for a time from about 1 hour to about 12 hours.

A suitable asphalt also has a saturates content not greater than about 32% by weight, preferably not greater than about 20%, and more preferably not greater than about 15%. It has been found difficult to control the viscosity of inks made from asphalts having higher levels of saturates. In particular, asphalts containing higher levels of saturates tend to form a gel when dissolved in the ink. This gelling causes lack of control of the ink viscosity.

Preferably the asphalt comprises, by weight, from about 80% to 100% (asphaltenes and resins) and from 0% to about 20% saturates, and more preferably from about 85% to about 98% (asphaltenes and resins) and from about 2% to about 15% saturates. A particularly preferred asphalt has a weight ratio of (asphaltenes and resins) to saturates of at least about 85:15. These weight percentages and ratios are based on Corbett analysis as published in Analytical Chemistry, Volume 41, No. 4, 1969, pages 576–579.

Preferred asphalts for use in the invention are solvent extracted asphalts. Solvent extraction techniques are well-known in the art and typically employ the use of a C3–C5 alkane, usually propane. These techniques are variously referred to in the art as deasphalting or as producing a propane deasphalted asphalt (PDA), a propane washed asphalt (PWA), or a propane extracted asphalt (PEA). Typically such techniques involve treating normal crude oil and/or vacuum residue feedstock with such alkanes whereby a treated asphalt is obtained in which the level of saturates, compared to the originally treated material, is decreased and the levels of asphaltenes and resins are increased.

Exemplary of the solvent extracted asphalts is Shell PDA (propane deasphalted asphalt) available from Shell Chemical Co. (Houston, Tex.). Shell PDA usually contains, by weight, from about 4% to about 15% asphaltenes, from about 15% to about 70% resins and from about 2% to about 20% saturates. This asphalt typically has a softening point from about 65° C. to about 85° C. and a penetration from about 1 dmm to about 18 dmm at 25° C.

Propane washed asphalts are available from Sun Oil Co., Toledo, Ohio under their tradename Monar, from Atlas Refining Co. (Shreveport, La.), and from Cenex Refining Co. (Laurel, Minn.). Such propane washed asphalts contain by weight, from about 0.2% to about 26% asphaltenes, usually from about 20% to about 26%; from about 58% to about 90% resins, usually from about 68% to about 90%; and from about 1% to about 10% saturates, usually from about 7% to about 10%. These asphalts typically have softening points from about 65° C. to about 100° C. and have penetrations from 0 to about 10 dmm at 25° C.

Another suitable solvent extracted asphalt is available from Fina Oil & Chemical Co. (Dallas, Tex.) as the asphaltene fraction of the ROSE process, i.e., the residuum oil supercritical extraction process, for example, that developed by Kerr-McGee Refining Corp. This asphalt usually contains, by weight, greater about 40% asphaltenes, less than about 27% resins and less than about 33% saturates. Typically, this asphalt has a softening point from about 85° C. to about 120° C., and a penetration not greater than about 5 dmm at 25° C.

The asphalt is provided in granular form for use in the ink of this invention. A suitable granular asphalt has a particle size not greater than about 2.38 mm (8 mesh). The particle size is measured by United States Sieve Series using a procedure similar to ASTM method D452. Granular asphalt having a larger particle size is very difficult to dissolve in the carrier. Preferably the asphalt has a particle size not greater than about 1.68 mm (12 mesh), and more preferably from about 0.84 mm (20 mesh) to about 0.074 mm (200 mesh). This particle size can be produced by grinding the asphalt by a conventional method, for example in a hammer mill or a cage mill. Preferably the asphalt is first cooled at a temperature from about 10° C. to about 50° C. for a time from about 1 hour to about 24 hours, and then ground for a time from about 1 minute to about 10 minutes.

In addition to the asphalt, the ink also includes a colorant which provides color contrast with the substrate to which the ink is applied. The asphalt functions as a partial replacement for the colorant, so that lower levels of colorant can be used than are typically required. Suitable colorants include pigments, dyes and toners. The pigment can be an organic or inorganic pigment. Carbon black and furnace black are typical black pigments for use in inks. The dye can be present in particulate state, dissolved state, or absorbed/adsorbed state associated with a pigment or toner. The toner can be selected from suitable materials known in the art, such as barium lithol, monastral blue, or a magnetizable substance such as magnetite or ferrite.

The ink also includes a carrier for the asphalt and colorant. As discussed above, it has been discovered that the hard asphalt of this invention is more soluble than expected in aliphatic oils and solvents. Consequently, these aliphatic materials can be used as the carrier instead of aromatic oils. Preferably at least about 50% by weight of the carrier of this invention is an aliphatic oil or aliphatic solvent, or mixtures thereof, more preferably at least about 85%, and most preferably at least about 95%. Any remaining portion of the carrier can include other oils and solvents known for use in inks. Preferred aliphatic oils and aliphatic solvents are selected from aliphatic hydrocarbons having 12–15 carbon atoms, aliphatic naphthas having 6–13 carbon atoms, aliphatic mineral oils and vegetable oils, and mixtures thereof. The asphalt of this invention has a solubility of at least about 75%, and preferably at least about 80%, in aliphatic hydrocarbons having 12–15 carbon atoms.

In the past, typical carriers have included a resin binder material dissolved in various oils or solvents. Advantageously, the asphalt used in the ink of this invention functions as a binder, so that it is not necessary to include a resin binder material. However, a reduced amount of binder can still be added to the carrier if desired. Such binders include wood or gum rosin, coumarone-indene resins, other alkyd resins, rosin esters such as ester gum, and phenolic resins such as modified phenol-formaldehyde resin, and other materials known for use as binders in inks.

Preferably the ink also includes a viscosity modifying agent to thicken or otherwise control the viscosity of the ink. Because the composition of the asphalt is uniform and consistent, the viscosity modifying agent can work to control the ink viscosity. The preferred viscosity of the ink will vary depending on its application. Suitable viscosity modifying agents include titanates, aluminates, cellulosic polymers, and other such materials known in the art. Preferred viscosity modifying agents are clays including bentonites such as sodium bentonite, kaolins, attapulgites and montmorillonites.

The ink can also optionally contain additives such as rubber or other elastomers, waxes, plasticizers, metallic dryers, antioxidants, lubricants, metallic soaps, phosphatides such as lecithin, or sulfur containing compounds such as sulphosuccinates. Other suitable additives are well-known in the ink industry.

The overall composition of the ink, by weight, is preferably from about 2% to about 60% asphalt, from about 2% to about 30% colorant, from about 2% to about 50% carrier comprising at least about 85% aliphatic oil and/or aliphatic solvent, and from 0% to about 20% viscosity modifying agent. The asphalt provides some tackiness to the ink in addition to functioning as a binder and a colorant. The ink requires a certain amount of tackiness to adhere to the substrate such as paper. However, if the ink contains too much asphalt, the ink will remain very tacky on the substrate instead of drying. Preferably the ink contains from about 2% to about 50% asphalt, and more preferably from about 20% to about 40%.

Various methods are suitable for manufacturing the ink. In one method, the carrier is first prepared by dissolving a viscosity modifying agent in an aliphatic oil or aliphatic solvent. Then the asphalt is dissolved in the carrier by mixing. Then the colorant is dispersed into the carrier by attrition or shearing, usually by use of a mill or homogenizer. In another method, all the ingredients are first mixed together, and then milled until the desired ink properties are obtained.

EXAMPLE

Shell PDA (propane deasphalted asphalt) is provided having an original softening point of 77° C., a penetration of 4 dmm at 25° C., and a typical saturates content of 18% by weight. The asphalt is subjected to an air blowing process in a converter at a temperature of 246° C. for a time of 4 hours, 45 minutes. The resulting asphalt has a softening point of 123° C. and a penetration of 0.5 dmm at 25° C. After air blowing, the asphalt is cooled at 25° C. for 8 hours. Then the asphalt is ground in a hammer mill for 3 minutes to a particle size not greater than 1.68 mm (12 mesh) and specifically to an average particle size of about 0.042 mm. The granular asphalt is dissolved in a carrier containing greater than 95% by weight aliphatic hydrocarbon having 12-15 carbon atoms, and a viscosity modifying agent. The weight percentage of asphalt in the ink is between 20% and 40%. The asphalt is about 95% soluble in the aliphatic hydrocarbon. Carbon black is dispersed into the carrier. The resulting ink has a viscosity and other properties which make it well suited for use as a printing ink.

It will be evident from the foregoing that various modifications can be made to this invention. Such, however, are considered as being within the scope of this invention.

INDUSTRIAL APPLICABILITY

While the invention has been described in terms of a piling ink, it is understood that the invention can also be applied to other kinds of inks. For example, the ink can be a ball point ink, a stamp pad ink, a laminating ink, a transfer ink, a dry lithography ink, or other inks.

We claim:

1. An ink comprising from about 2% to about 60% petroleum-derived asphalt, from about 2% to about 30% colorant, and from about 2% to about 50% carrier for the asphalt and colorant, where at least about 50% by weight of the carrier is a material selected from the group consisting of aliphatic oils, aliphatic solvents, and mixtures thereof, and where the asphalt has a softening point from about 105° C. to about 155° C. and a saturates content not greater than about 32% by weight.

2. The ink of claim 1 in which the asphalt has a saturates content not greater than about 20% by weight.

3. The ink of claim 1 in which the asphalt has a softening point from about 120° C. to about 155° C.

4. The ink of claim 1 in which the asphalt has a penetration not greater than about 15 dmm at 25° C.

5. The ink of claim 1 in which the asphalt comprises, by weight, from about 80% to 100% (asphaltenes and resins) and from 0% to about 20% saturates.

6. The ink of claim 1 in which the asphalt is a solvent extracted asphalt.

7. The ink of claim 1 additionally comprising a viscosity modifier.

8. The ink of claim 1 in which at least about 85% by weight of the carrier is a material selected from the group consisting of aliphatic oils, aliphatic solvents, and mixtures thereof.

9. The ink of claim 8 in which the asphalt has a penetration not greater than about 15 dmm at 25° C.

10. The ink of claim 1 in which at least about 50% by weight of the carrier is an aliphatic hydrocarbon having 12-15 carbon atoms.

11. The ink of claim 10 in which at least about 85% by weight of the carrier is an aliphatic hydrocarbon having 12-15 carbon atoms.

12. The ink of claim 11 in which the asphalt has a penetration not greater than about 15 dmm at 25° C.

13. An ink comprising from about 2% to about 60% petroleum-derived asphalt having a saturates content not greater than about 32% by weight, from about 2% to about 30% colorant, and from about 2% to about 50% carrier for the asphalt and colorant, where at least about 50% by weight of the carrier is a material selected from the group consisting of aliphatic oils, aliphatic solvents, and mixtures thereof, and where the asphalt has an original softening point from about 50° C. to about 100° C. and is subjected to an oxidizing process to provide a final softening point from about 105° C. to about 155° C.

14. The ink of claim 13 in which the final softening point of the asphalt is from about 120° C. to about 155° C.

15. The ink of claim 13 in which the asphalt has a saturates content not greater than about 20% by weight.

16. The ink of claim 13 in which the asphalt has a penetration not greater than about 15 dmm at 25° C.

17. A method of making an ink comprising providing a petroleum-derived asphalt having a softening point from about 105° C. to about 155° C. and a saturates content not greater than about 32% by weight, granulating the asphalt to a particle size not greater than about 2.38 mm, dissolving the asphalt in a carrier, and adding a colorant to the carrier to make an ink comprising from about 2% to about 60% asphalt, from about 2% to about 30% colorant, and from about 2% to about 50% carrier.

18. The method of claim 17 in which the asphalt is granulated to a particle size not greater than about 1.68 mm.

19. The method of claim 17 in which the asphalt is first cooled at a temperature from about 10° C. to about 50° C. for a time from about 1 hour to about 24 hours, and then ground for a time from about 1 minute to about 10 minutes.

20. The method of claim 17 in which the asphalt has an original softening point from about 50° C. to about 100° C. and is subjected to an oxidizing process to provide a final softening point from about 105° C. to about 155° C.

* * * * *